United States Patent
Van Den Acker et al.

(10) Patent No.: US 6,783,170 B1
(45) Date of Patent: Aug. 31, 2004

(54) BACKLITE STORAGE AND CONVERTIBLE DECKLID SYSTEM FOR AUTOMOTIVE VEHICLE

(75) Inventors: Laurens Van Den Acker, Laguna Beach, CA (US); Jonathan Vallis, Aliso Viejo, CA (US); Dennis Flick, Irvine, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/249,603

(22) Filed: Apr. 23, 2003

Related U.S. Application Data

(60) Provisional application No. 60/437,906, filed on Jan. 4, 2003.

(51) Int. Cl.[7] .............................................. B62D 25/10
(52) U.S. Cl. .................................... 296/146.16; 296/76
(58) Field of Search ................................ 296/201, 35.3, 296/37.1, 146.16, 76, 76.11, 107.07

(56) References Cited

U.S. PATENT DOCUMENTS

| | | | | |
|---|---|---|---|---|
| 1,796,081 A | * | 3/1931 | Bundy | 296/76 |
| 3,082,033 A | * | 3/1963 | Bosher | 296/76 |
| 4,801,174 A | | 1/1989 | Hirshberg et al. | |
| 4,877,283 A | * | 10/1989 | Little et al. | 296/76 |
| 5,975,620 A | | 11/1999 | Jambor et al. | |
| 6,260,916 B1 | * | 7/2001 | Hunt | 296/190.11 |
| 6,361,097 B1 | | 3/2002 | Lechkum | |
| 6,419,308 B1 | | 7/2002 | Corder et al. | |
| 6,533,343 B2 | * | 3/2003 | Bohm et al. | 296/100.02 |
| 6,644,707 B2 | * | 11/2003 | McLaughlin et al. | 296/76 |
| 2002/0135200 A1 | * | 9/2002 | De Gaillard | 296/107.01 |

OTHER PUBLICATIONS

Cadillac 2003 catalog, printed Aug. 2002.*
Chevy Trucks 2002 catalog, printed Sep. 2001.*

* cited by examiner

Primary Examiner—Jason Morrow
(74) Attorney, Agent, or Firm—Gigette Bejin

(57) ABSTRACT

A system and method for modifying a rear cargo compartment of an automotive vehicle includes a decklid capable of enclosing for storage the vehicle's backlite. With or without backlite enclosed within the decklid, the decklid may remain attached to the vehicle in its conventional position, may be moved to a stowage location within the vehicle, or may be detached from the automotive vehicle entirely and stowed in an external location.

19 Claims, 9 Drawing Sheets

BACKLITE STORAGE AND CONVERTIBLE DECKLID SYSTEM FOR AUTOMOTIVE VEHICLE

This Application claims the benefit of U.S. Provisional Application No. 60/437,906, filed on Jan. 4, 2003.

BACKGROUND OF INVENTION

BACKGROUND OF INVENTION

1. Field of the Invention

The present invention relates to a decklid for the rear cargo compartment of an automotive vehicle, including a provision for storing a backlite (rear window) within the decklid and with the decklid being stowable within the rear cargo compartment.

2. Disclosure Information

Automotive designers increasingly seek to add flexibility to automotive designs. Flexibility in design and functionality can increase customer satisfaction and convenience. One area of flexible design known to be especially attractive to consumers is the ability to temporarily modify storage space. Pickup trucks, SUV's, and other light vans and trucks allow consumers to store and transport larger, or multiple, items not typically transportable in conventional automobiles, but many consumers prefer a standard automobile design for aesthetic reasons or in order to realize better fuel efficiency, lower operating costs, or greater passenger capacity. Many consumers need extended capacity only occasionally, and are unwilling to suffer the disadvantages of a pickup, van, or SUV.

The present inventors have determined that an automobile having a traditional design including a backlite and decklid covering a rear cargo space (a trunk) can be modified to allow storage of the backlite within the decklid, as well as stowage of the decklid within the cargo compartment, or removal of the decklid from the vehicle entirely.

U.S. Pat. No. 6,361,097 illustrates a trunk assembly comprising a rear cargo compartment and a decklid. The system of the '097 patent allows the decklid to be placed in an open position, a closed position, and a stowed position, such that the stowed position allows the rear cargo compartment to be used as a pickup box. According to another aspect of the '097 patent, the backlite of the vehicle may be rotatably attached to lie on the top of the stowable decklid, such that the backlite may be removed and stowed with the decklid in the vehicle's rear cargo compartment. In contrast, the present invention comprises a system wherein the backlite is stored within the decklid itself, which is then stowable either within the vehicle or outside of the vehicle after detachment.

SUMMARY OF INVENTION

According to the present invention, a system and method allow modification of a rear cargo compartment in an automotive vehicle by permitting storage of the vehicle's backlite within the decklid, and enlargement of cargo capacity by allowing stowage of the decklid within the rear cargo compartment. The invention also permits an operator to detach the decklid from the vehicle, without tools or extraordinary efforts, for stowage. An operator can advantageously expand the usable cargo space in the rear cargo compartment by storing the vehicle's backlite within the decklid, thereby creating a "packed decklid" and then stowing the packed decklid in a convenient location within the vehicle or by detaching the packed decklid and removing it to a location outside of the vehicle. The present invention also contemplates that the decklid could be stowed without the backlite, or that the backlite could be stored within the decklid and the decklid remain in its conventional closed position for travel.

The present invention is advantageous because a system according to this invention increases functionality, flexibility and operator convenience for transporting larger items within a vehicle, while permitting enhancement of an open-air driving experience by enabling convenient removal of the backlite from its installed position.

Other advantages, as well as objects and features of the invention, will become apparent to the reader of this specification.

DETAILED DESCRIPTION

Figure 1:
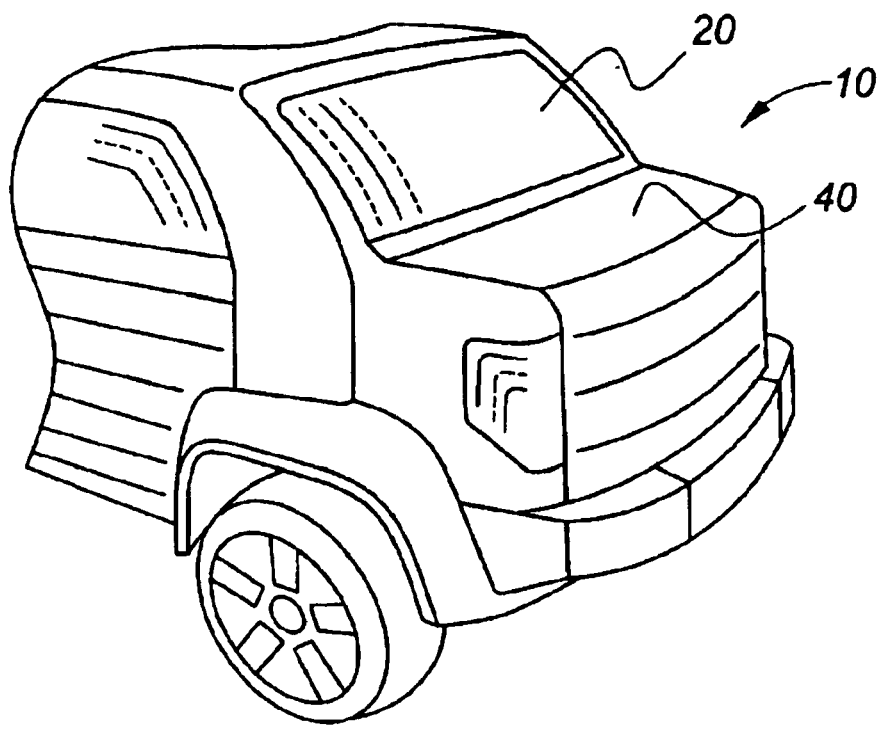
FIG. 1 illustrates the rear of an automotive vehicle, showing a typical configuration of a vehicle's backlite and a rear cargo compartment covered by a decklid.
Figure 2:
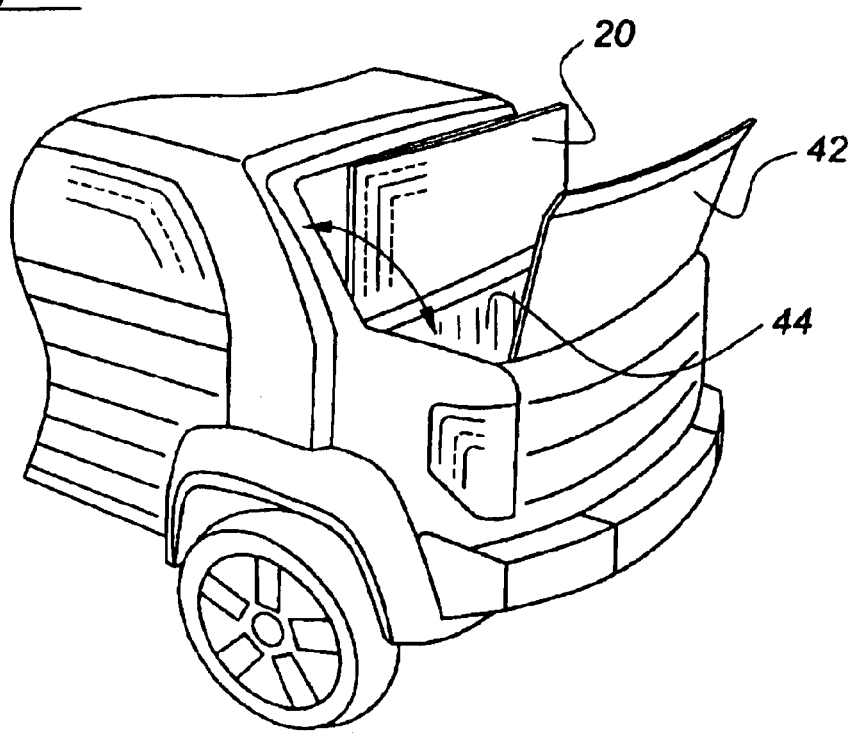
FIG. 2 shows the top panel of the decklid of FIG. 1, opened to expose an interior storage space within the decklid into which the backlite may be stored.

As shown in FIG. 1, decklid 40 covers rear cargo compartment 10. Backlite 20 protects passengers within the vehicle from adverse elements while providing visibility. As shown in FIG. 2, decklid 40 is comprised of top decklid panel 42 and bottom decklid panel 44. Between these two panels is a storage place sufficiently sized to store backlite 20. This interior decklid storage space may be accessed by a variety of means, including opening any of the six panels (top, bottom, or sides) comprising the decklid. FIG. 2 shows top decklid panel 42 hinged at the trailing edge of decklid 40 and opened to expose the backlite storage space within decklid 40. FIG. 2 also shows backlite 20 in the process of being stored within decklid 40. In the embodiment shown in FIG. 2, backlite 20 rotates substantially along its bottom edge to store within decklid 40, such that the external surface of backlite 20 faces down against bottom decklid panel 44. Backlite 20 could also be stored such that its external surface faces top decklid panel 42.

Figure 3:
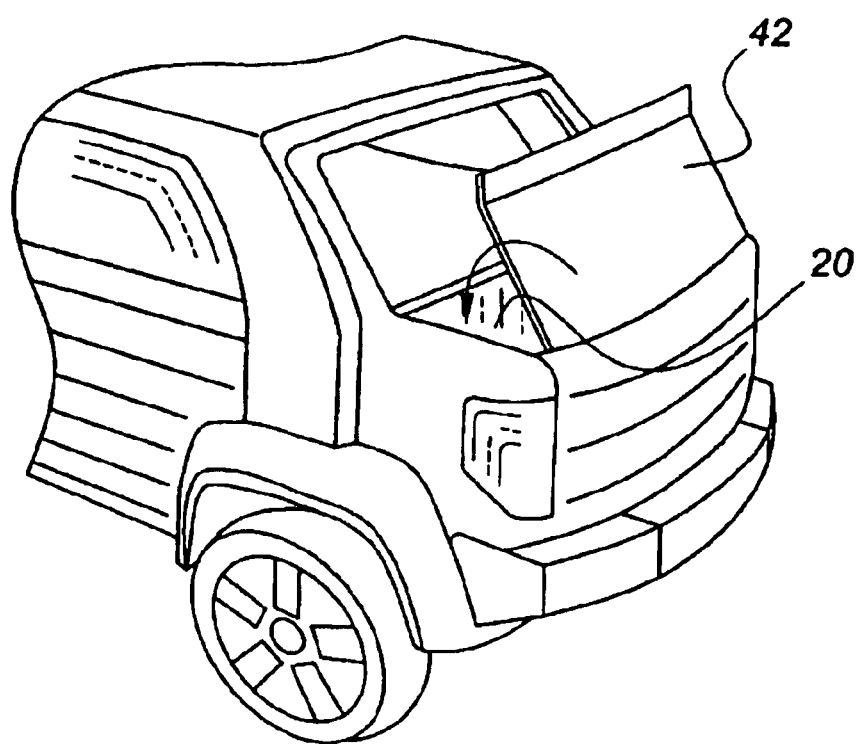
FIG. 3 shows the backlite of FIGS. 1 and 2 stored in the decklid and with the top panel of the decklid partially open.
Figure 4:
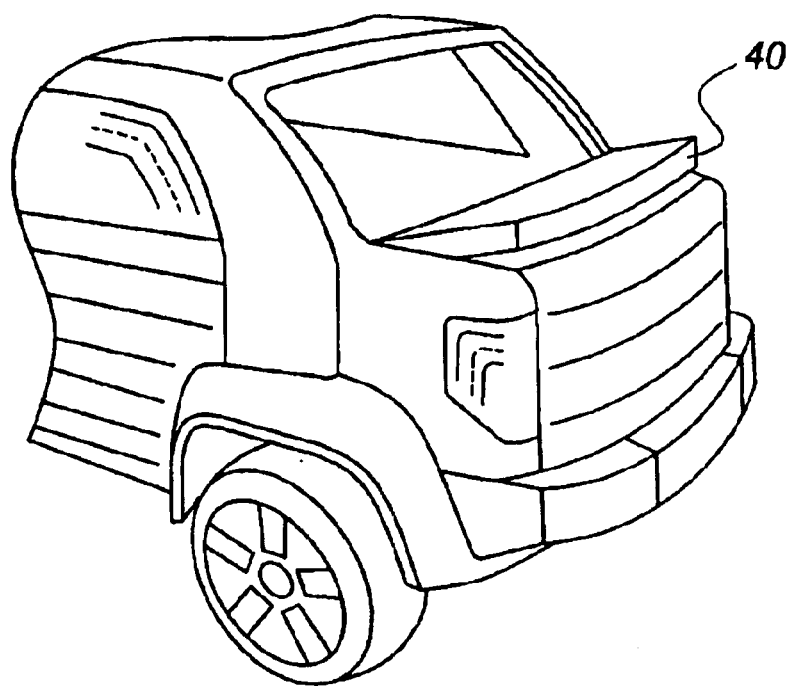
FIG. 4 shows the decklid fully enclosing the backlite, and with the decklid in a partially opened position to permit access to the rear cargo compartment.

FIG. 3 shows backlite 20 stored within decklid 40 and top decklid panel 42 in the process of being closed to fully enclose backlite 20 and to create a "packed" decklid. FIG. 4 shows decklid 40, with backlite 20 packed within it, slightly opened in conventional fashion to reveal the interior of the rear cargo compartment, illustrating how a system according to the present invention may be used to store a backlite within the decklid without altering the decklid's typical operation.

Figure 5:
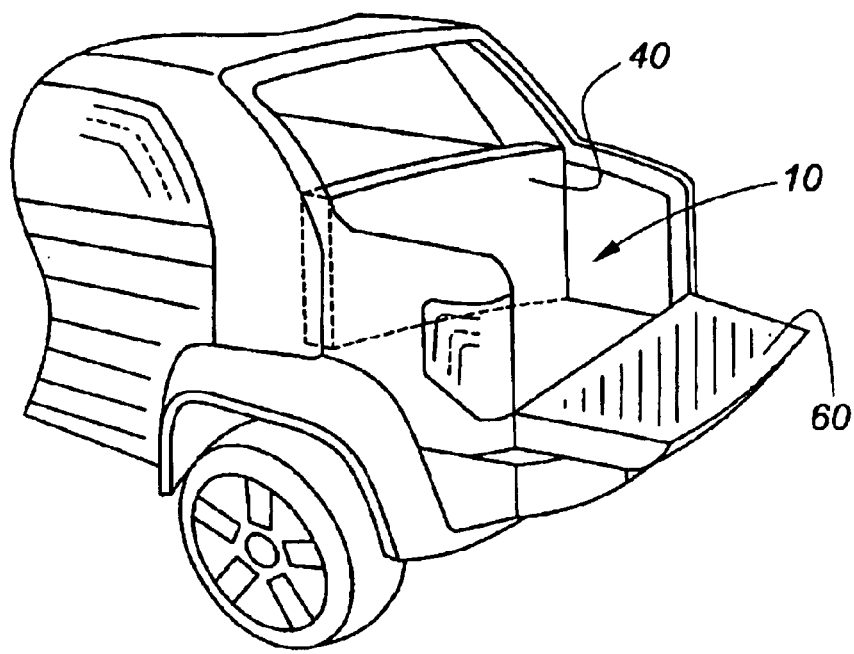
FIG. 5 shows the decklid and the enclosed backlite stowed behind the rear seats of the vehicle, with a tailgate providing additional cargo space and access.

FIG. 5 shows decklid 40 in its packed condition stowed at the forward edge of rear cargo compartment 10. The present invention contemplates that decklid 40 could be stowed within the automotive vehicle in a variety of locations. For example, it is common for automotive designers to install a strainer panel, commonly made of stamped metal, between the seat backs of the rear seats and the rear cargo compartment. The present invention contemplates that decklid 40 could be stowed between the rear seats and the rear strainer panel, or in the cargo compartment immediately behind the rear strainer panel. Decklid 40 could also be stowed on the floor of rear cargo compartment 10 or any other location within the vehicle depending on design preference. The present invention further contemplates that decklid 40 could be designed to permit an operator to detach it from the automotive vehicle entirely, without the use of tools, for removal to an external location such as a garage, for storage. Again, an operator might choose to store backlite 20 within decklid 40 in any of these stowage locations.

FIG. 5 further shows tailgate 60 opened to permit easier access to rear cargo compartment 10, while expanding cargo space. FIG. 5 shows tailgate 60 hingeably attached above the rear bumper along a horizontal axis. However, tailgate 60 could also be hingeably attached to the vehicle along one of its vertical edges. Tailgate 60 could also be replaced by two cargo compartment doors, each attached to the vehicle by vertical hinges at the left and right rear corners of the vehicle. "Tailgate" as used herein includes a single tailgate or a tailgate system incorporating one or more rear cargo compartment doors.

Figure 6:
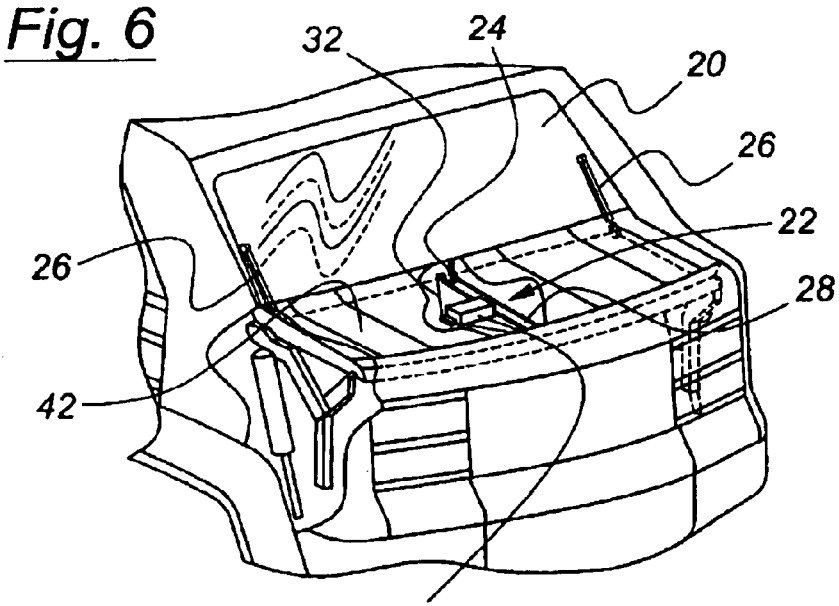
FIG. 6 is a cut away view showing a motorized backlite removal system and motorized decklid transfer system.
Figure 7:
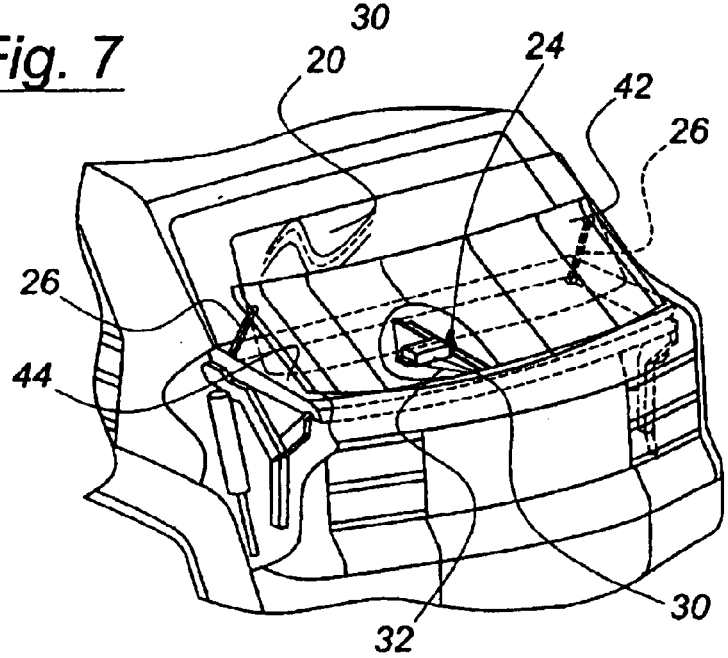
FIG. 7 is a drawing showing a backlite being moved into storage position by a motorized regulator unit within a decklid.
Figure 8:
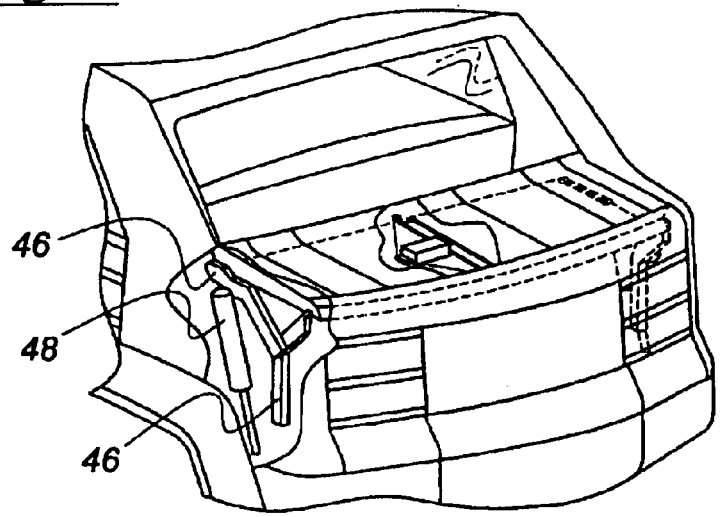
FIG. 8 shows a backlite stored within the decklid of FIGS. 6 and 7.
Figure 9:
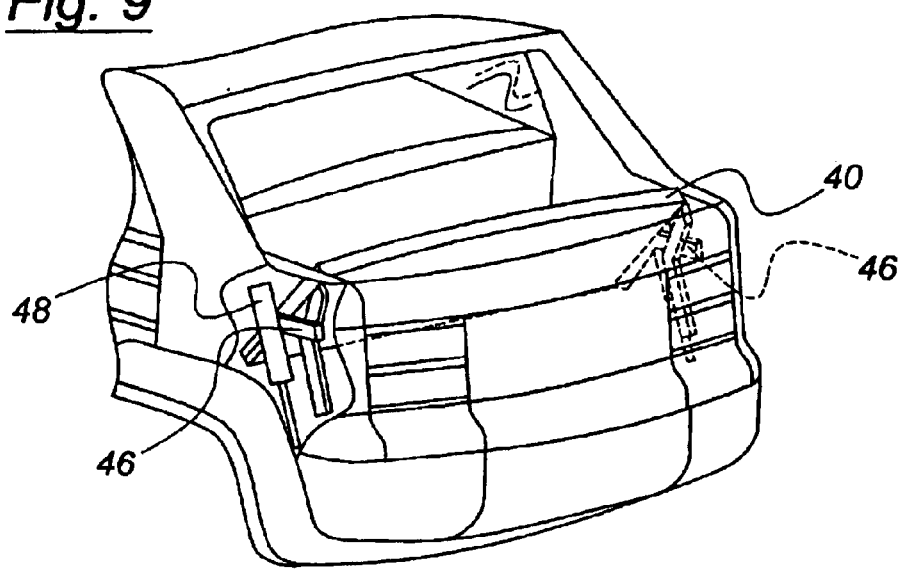
FIG. 9 shows a backlite stored within the decklid of FIGS. 6, 7, and 8 being translocated by motorized means to a stowage location within the vehicle's rear cargo compartment.
Figure 10:
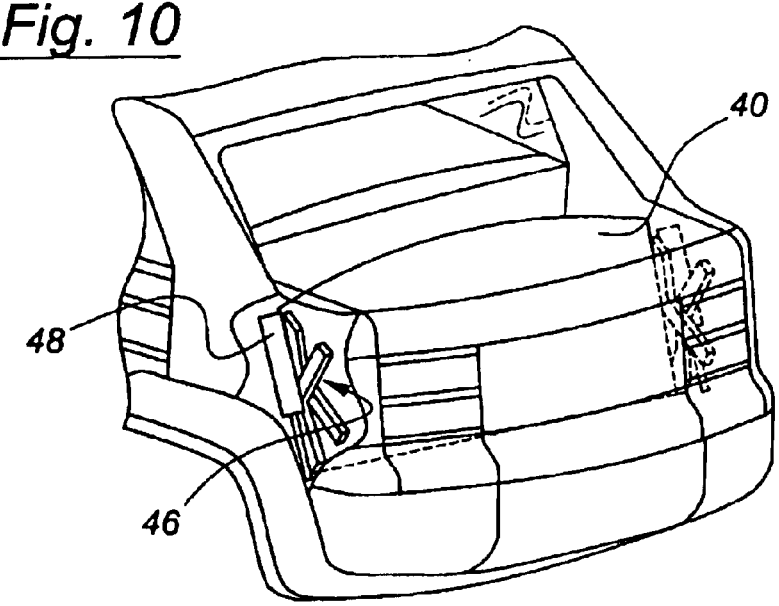
FIG. 10 is shows the decklid of FIG. 9 continuing to translocate.
Figure 11:
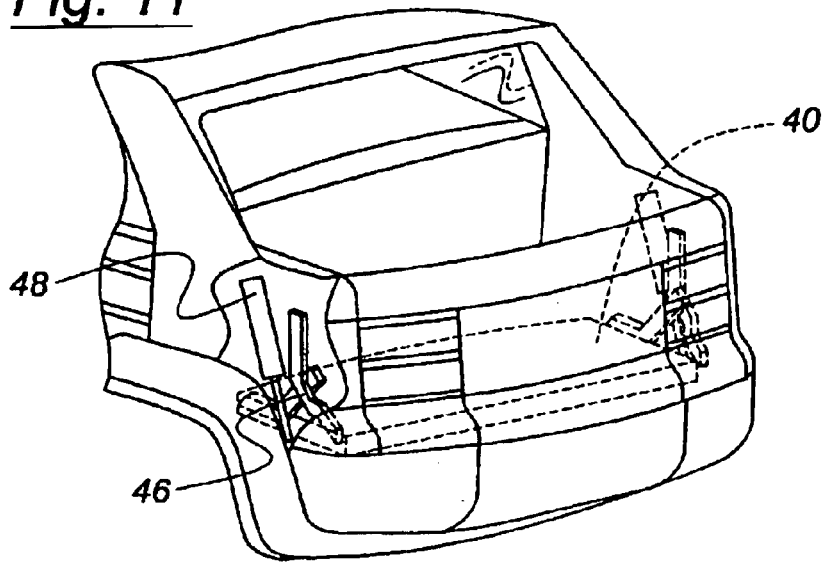
FIG. 11 shows the decklid of FIG. 10 in a stowed position upon the floor of a rear cargo compartment.

The inventors contemplate that it may be convenient or advantageous to motorize some aspects of the previously described rear cargo compartment modification system. FIGS. 6–11 show one embodiment of a motorized backlite removal system and a motorized decklid stowage system. As shown in FIGS. 6–8, backlite 20 can be removed from its installed position to a storage location within decklid 42 by use of an electrical motor drive glazing handling system similar to that used in traditional electric window applications in automotive vehicles. FIG. 6 shows top decklid panel 42 cut away to reveal backlite regulator unit 22. Backlite regulator unit 22 is comprised of a bidirectional backlite regulator motor drive 30, which draws a backlite transfer cable 32, which is looped through backlite transfer guide 28. In the motorized embodiment shown, a backlite transfer bracket 24 is attached to the bottom edge of backlite 20. When backlite regulator motor drive is 30 is actuated, backlite transfer cable 32 pulls backlite transfer bracket 24 rearward along backlite transfer guide 28. As shown in FIG. 7, as backlite transfer bracket 24 moves rearward, decklid top panel 42 opens to receive backlite 20, which is simultaneously moved rearward with backlite transfer bracket 24. Backlite 20 is guided into proper position within the decklid by backlite guide arms 26 attached to either side of backlite 20. FIG. 8 shows backlite 20 completely stored within decklid 40. These steps may be reversed to remove backlite 20 from the decklid and to reinstall it in its conventional location.

Figure 12:
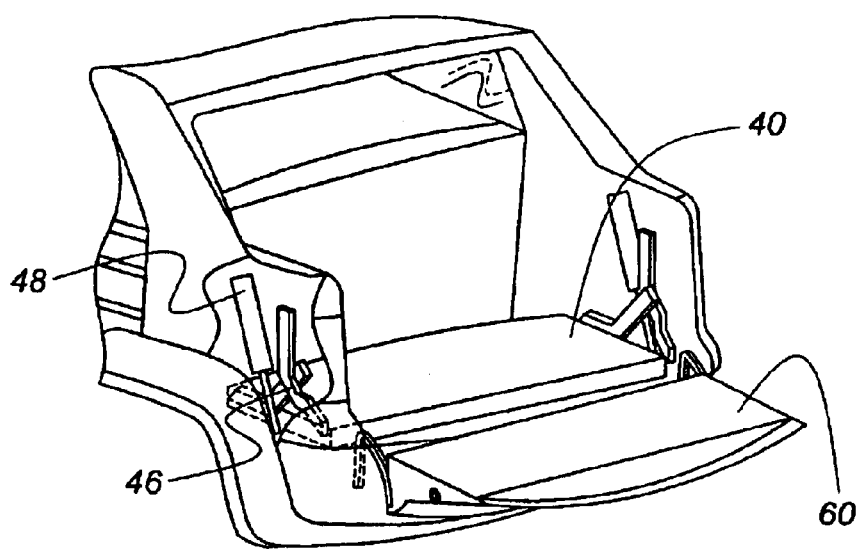
FIG. 12 shows the stowed decklid of FIG. 11 and an open tailgate.

FIGS. 8–11 show one embodiment of a motorized decklid transfer mechanism. A pair of decklid pivot arms 46 are attached to the floor or walls of rear cargo compartment 10 and to both ends of decklid 40. Two hydraulic decklid transfer cylinders 48 are attached to the vehicle and to one or more pairs of pivot arms 46 to move decklid 40 to a stowage location within the vehicle. FIGS. 8–11 are a sequential series of drawings showing decklid 40 being translocated from its conventional installed position to a stowage position on the floor of the rear cargo compartment. The embodiment illustrated shows decklid 40 being moved forward as it is rotated, so that the decklid is ultimately stowed top-side-down on the floor of the rear cargo compartment. FIG. 12 shows decklid 40 stowed on the floor of the rear cargo compartment and tailgate 60 opened to allow even greater access to the compartment.

The inventors contemplate that decklid transfer cylinders 48 will be of hydraulic design. Those skilled in the art will appreciate that other means of translocating decklid 40 could be readily substituted for the hydraulic cylinders, such as one or more electric motors powering the decklid movement by a system of pulleys and cables, or threaded screws, or gears, or pneumatic cylinders. Of course, storage of the backlite within the decklid, storage of the decklid, and any or all of the steps illustrated in FIGS. 6–12, could be accomplished by manual means without the use of motor drives.

Although the present invention has been described in connection with particular embodiments thereof, it is to be understood that various modifications, alterations, and adaptations may be made by those skilled in the art without departing from the spirit and scope of the invention. It is intended that the invention be limited only by the appended claims.

What is claimed is:

1. A system for modifying a rear cargo compartment of an automotive vehicle, comprising:
   a rear cargo compartment;
   a decked moveable between an open position exposing said rear cargo compartment, and a closed position covering said rear cargo compartment;
   top and bottom panels, which are integral with the decklid, and which form an interior storage space within said decklid so as to provide a space for storing a backlite; and
   a backlite retention system permitting removal of said backlite from its installed position to the interior storage space within said decklid without the use of tools.

2. A system according to claim 1, further comprising a motor drive that moves said backlite from its installed position to the interior storage space within said decklid.

3. A system according to claim 1, wherein said decklid is moveable from its installed position to a stowed position in the rear cargo compartment.

4. A system according to claim 3, further comprising a motor drive to translationally move the decklid from its installed position to a stowed position in the rear cargo compartment.

5. A system according to claim 3, further comprising a space for stowing said decklid behind rear seats of the vehicle.

6. A system according to claim 5, further comprising a space for stowing said decklid behind a strainer panel that separates rear seats from the rear cargo compartment.

7. A system according to claim 5, further comprising a motor drive to translationally move the decklid from its installed position to a stowed position behind said rear seats of the vehicle.

8. A system according to claim 3, further comprising a space for stowing said decklid on a floor of said rear cargo compartment.

9. A system according to claim 8, further comprising a motor drive to translationally move the decklid from its installed position to a stowed position on said floor of said rear cargo compartment.

10. A system according to claim 3, further comprising a tailgate that is hingeably attached to the vehicle body so that said tailgate may rotate between an open and a closed position.

11. A system according to claim 10, further comprising a space for stowing said decklid immediately behind rear seats of the vehicle.

12. A system according to claim 10, further comprising a place for stowing said decklid behind a strainer panel that separates rear seats from the rear cargo compartment.

13. A system according to claim 10, further comprising a place for stowing said decklid on a floor of said cargo compartment.

14. A system for modifying a rear cargo compartment of an automotive vehicle, comprising:

a rear cargo compartment;

a decklid moveable between an open position exposing said rear cargo compartment, a closed position covering said rear cargo compartment, and a stowed position in the rear cargo compartment;

a mechanism for allowing removal of the decklid, without tools, to a storage location external to the automotive vehicle;

top and bottom panels, which are integral with the decklid, and which form an interior storage space within said decklid so as to provide a space for storing a backlite; and a backlite retention system permitting removal of said backlite from its installed position to the interior storage space within said decklid without the use of tools.

15. A system according to claim 14, further comprising a space for stowing said decklid containing said backlite behind rear seats of the vehicle.

16. A system according to claim 15, further comprising a tailgate that is hingeably attached to the vehicle body so that said tailgate may rotate between an open and a closed position.

17. A method of modifying the rear cargo compartment of an automotive vehicle, comprising the steps of:

exposing an interior storage space located within a decklid;

moving the backlite of the vehicle from an installed position to a storage position within the decklid; and enclosing the backlite within the decklid storage space, so as to create a packed decklid.

18. A method according to claim 17, further comprising the step of translationally moving the packed decklid to a stowage location within a rear cargo compartment of the vehicle.

19. A method according to claim 18, further comprising the step of opening a tailgate that is hingeably attached to the vehicle.

* * * * *